US009044699B2

(12) United States Patent
Gale et al.

(10) Patent No.: US 9,044,699 B2
(45) Date of Patent: Jun. 2, 2015

(54) FILTRATION SYSTEM (75) Inventors: Brian D. Gale, Blaine, MN (US); David M. Botts, Minnestrista, MN (US); Karl J. Fritze, Hastings, MN (US); Laurence W. Bassett, Killingworth, CT (US); Richard A. Kirchner, Apple Valley, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1122 days.

(21) Appl. No.: 13/062,008

(22) PCT Filed: Sep. 2, 2009

(86) PCT No.: PCT/US2009/055643
§ 371 (c)(1),
(2), (4) Date: Jun. 28, 2011

(87) PCT Pub. No.: WO2010/027989
PCT Pub. Date: Mar. 11, 2010

(65) Prior Publication Data
US 2011/0247974 A1    Oct. 13, 2011

Related U.S. Application Data (60) Provisional application No. 61/094,737, filed on Sep. 5, 2008.

(51) Int. Cl.
*B01D 27/00*      (2006.01)
*B01D 35/00*      (2006.01)
(Continued)

(52) U.S. Cl.
CPC ........... *B01D 35/30* (2013.01); *Y10T 29/49826* (2015.01); *B01D 2201/302* (2013.01); *B01D 2201/4015* (2013.01); *B01D 2201/4023* (2013.01); *B01D 2201/4076* (2013.01)

(58) Field of Classification Search
CPC ................. B01D 2201/4007; B01D 2201/302; B01D 2201/305; B01D 35/147; B01D 2201/16

USPC ......... 210/145, 146, 147, 232, 235, 236, 238, 210/234, 454, 237, 416.4, 416.5
See application file for complete search history.

(56) References Cited

U.S. PATENT DOCUMENTS 1,688,326 A    10/1928   Boulade
2,857,128 A    10/1958   Stern
(Continued)

FOREIGN PATENT DOCUMENTS

EP         0269054     6/1988
JP         51-029619   7/1976
(Continued)

OTHER PUBLICATIONS

International Search Report for PCT/US2009/055643, dated Mar. 22, 2010.
(Continued)

*Primary Examiner* — Nam Nguyen
*Assistant Examiner* — Claire Norris
(74) *Attorney, Agent, or Firm* — Alexander Medved; Scott A. Baum (57) ABSTRACT

A filtration system is disclosed comprising a filter manifold and a filter cartridge. The filter manifold comprises a bracket, a valve, a manifold feed port, a manifold filtrate port, and a handle. The valve is held by the bracket and comprises a fixed portion attached to the bracket and a rotary portion. The handle is operatively connected to the rotary portion and comprises a cartridge lifter having one of a camming ramp or a camming lug lifter engagement feature. The handle is rotatable to a service position and a disengaged position, wherein the manifold feed port is blocked by the valve when the handle is in the disengaged position. The filter cartridge comprises a cartridge feed port, a cartridge filtrate port, and an external cartridge surface having one of a camming lug or a camming ramp for engaging the lifter engagement feature.

20 Claims, 9 Drawing Sheets

(51) Int. Cl.
  *B01D 35/30* (2006.01)
  *B01D 29/00* (2006.01)
  *B01D 35/157* (2006.01)

(56) References Cited

U.S. PATENT DOCUMENTS

| | | | |
|---|---|---|---|
| 3,399,776 A | | 9/1968 | Knuth |
| 3,643,692 A | | 2/1972 | Traylor |
| 3,684,100 A | | 8/1972 | Close |
| 3,727,764 A | | 4/1973 | Ogden |
| 3,742,970 A | | 7/1973 | Gross |
| 3,823,742 A | | 7/1974 | Von Corpon |
| 3,926,187 A | | 12/1975 | Iglesias |
| 4,108,207 A | | 8/1978 | Doody |
| 4,469,131 A | | 9/1984 | Traylor |
| 4,529,515 A | * | 7/1985 | Selz ............... 210/234 |
| 4,711,717 A | | 12/1987 | Wolf |
| 4,818,396 A | | 4/1989 | Wolf |
| 4,836,925 A | | 6/1989 | Wolf |
| 4,905,965 A | | 3/1990 | Dolev |
| 4,979,530 A | | 12/1990 | Breda |
| 5,152,321 A | | 10/1992 | Drager |
| 5,230,812 A | | 7/1993 | Williams |
| 5,389,260 A | * | 2/1995 | Hemp et al. ............ 210/652 |
| 5,397,462 A | | 3/1995 | Higashijima |
| 5,445,734 A | | 8/1995 | Chen |
| 5,461,948 A | | 10/1995 | Perrero, Jr. |
| 5,511,464 A | | 4/1996 | Cezanne et al. |
| 5,882,511 A | | 3/1999 | Blomquist |
| 5,919,362 A | | 7/1999 | Barnes |
| 5,931,196 A | | 8/1999 | Bernardi |
| 6,422,267 B1 | | 7/2002 | Makishima et al. |
| 6,457,698 B2 | | 10/2002 | Wichmann |
| 6,458,269 B1 | | 10/2002 | Bassett et al. |
| 6,579,455 B1 | | 6/2003 | Muzik et al. |
| 6,645,376 B2 | | 11/2003 | Marioni |
| 6,857,670 B2 | | 2/2005 | Fritze |
| 6,899,132 B2 | | 5/2005 | Mikiya et al. |
| 6,949,189 B2 | | 9/2005 | Bassett et al. |
| 7,000,894 B2 | | 2/2006 | Olson |
| 7,147,773 B2 | | 12/2006 | Mitchell |
| 7,387,210 B2 | * | 6/2008 | Burrows et al. ............ 210/443 |
| 7,501,057 B1 | | 3/2009 | Go |
| 7,651,070 B2 | * | 1/2010 | Ruprecht ............... 251/149.9 |
| 2002/0017497 A1 | | 2/2002 | Fritze |
| 2003/0019805 A1 | | 1/2003 | Fritze |
| 2003/0019819 A1 | | 1/2003 | Fritze |
| 2005/0067342 A1 | | 3/2005 | Bassett et al. |
| 2006/0032806 A1 | | 2/2006 | Parker |
| 2006/0060512 A1 | | 3/2006 | Astle et al. |
| 2006/0113240 A1 | | 6/2006 | Burrows et al. |
| 2008/0000820 A1 | * | 1/2008 | Mitchell ................ 210/141 |
| 2008/0156711 A1 | | 7/2008 | Vitan |

FOREIGN PATENT DOCUMENTS

| | | |
|---|---|---|
| JP | 58-67510 | 5/1983 |
| KR | 10-0772889 | 11/2007 |
| KR | 10-0870572 | 11/2008 |
| WO | WO 2005/077490 | 8/2005 |
| WO | WO 2006/124906 | 11/2006 |
| WO | WO 2010/027989 | 3/2010 |

OTHER PUBLICATIONS

International Search Report for PCT/US2006/018929, dated Oct. 4, 2006.

\* cited by examiner

FILTRATION SYSTEM

CROSS REFERENCE TO RELATED APPLICATIONS

This application is a national stage filing under 35 U.S.C. 371 of PCT/US2009/055643, filed Sep. 2, 2009, which claims priority to Provisional Application No. 61/094,737, filed Sep. 5, 2008, the disclosure of which is incorporated by reference in its/their entirety herein.

BACKGROUND

Water filtration systems are often employed in residential and commercial applications. Such systems are typically installed in a water supply and work to provide filtered water to faucets, drinking water dispensers, and the like. In some residential applications, a filtration system is installed underneath a countertop, for example, in a kitchen. In many instances, such systems have a homeowner changeable, disposable filter cartridge. When the service life of a disposable filter cartridge has expired, the homeowner must remove the spent filter cartridge and install a new filter cartridge. Where such systems are located underneath a countertop, it may be difficult for the homeowner to reach the system and perform the necessary installation steps. Often, such locations are cramped and available space, both for the system itself and for the homeowner to reach the system, is limited. After a new filter cartridge has been installed, the entire spent filter cartridge is typically disposed of.

There is a continuing need for filtration systems that take up less space, are quick and simple to maintain, and contribute less environmental waste when spent filter cartridges are disposed of.

SUMMARY OF THE INVENTION

The present disclosure relates generally to a filter manifold and filtration system that can reduce the time and effort necessary to service a filtration system. Filter cartridges according to the present disclosure can be installed with a single pull of a handle to pick up the filter cartridge and engage it to the filter manifold. The filter manifold and filtration system of the present disclosure may have a low-profile construction that can reduce the space occupied by a water filtration system. Further, because less material can be used, the present invention can reduce environmental waste associated with disposing of spent filter cartridges.

The present application discloses a filter manifold comprising a valve. In some embodiments, the valve comprises a fixed portion, a rotary portion, and a rotation lock connected to the rotary portion. The manifold further comprises a manifold feed port and a manifold filtrate port. A handle is operatively connected to the rotary portion and comprises a cartridge lifter. In some embodiments, the cartridge lifter comprises a lifter engagement feature selected from the group consisting of a camming ramp and a camming lug. The handle is rotatable to a service position and a locked position, wherein, when the handle is in the locked position, rotation is prevented by the rotation lock and the manifold feed port is blocked by the valve.

In one embodiment, the filter manifold further comprises a bracket, wherein the valve is held by the bracket, wherein the fixed portion is attached to the bracket.

In one embodiment, the filter manifold further comprises a cartridge support shelf. The cartridge support shelf may be disposed on the bracket in a position below the cartridge lifter when the handle is in the service position. The cartridge support shelf may alternatively be a part of the fixed portion of the valve.

In some embodiments, the rotation lock comprises a depressible member connected to the rotary portion of the valve and protruding through an aperture in the fixed portion of the valve. In one embodiment, the depressible member is depressible from a locking position to an unlocking position. In some embodiments, the depressible member protrudes through the aperture when in the locking position and is recessed within the fixed portion of the valve when in the unlocking position. In one embodiment, the depressible member is in the unlocking position when the handle is in the service position.

In one embodiment, the rotary portion of the valve comprises a bypass channel fluidly connecting the manifold feed port to the manifold filtrate port when the handle is in the locked position. Where appropriate, the rotary portion of the valve comprises a two-part shell, the two-part shell having a first cylindrical portion and second cylindrical portion, each cylindrical portion comprising a connection end having a recess therein for locating the depressible member and a fluid connector for a portion of the bypass channel. The connection ends of the first and second cylindrical portions connect to one another with a bayonet connection to locate the depressible member and to fluidly connect the bypass channel.

In some embodiments, the fixed portion of the valve comprises a longitudinal axis, a first end oriented along the longitudinal axis, and a second end opposing the first end. In such embodiments, a first axial extension of the rotary portion protrudes from the first end, and a second axial extension of the rotary portion protrudes from the second end. The handle may be affixed to the first and second axial extensions In some embodiments, a filter manifold further comprises a filter cartridge having a cartridge feed port, a cartridge filtrate port, and a rotation key, wherein the rotation key depresses the depressible member to the unlocking position. In one embodiment, the depressible member comprises a first distal surface and the rotation key comprises a protrusion from the filter cartridge. The protrusion may have a second distal surface, wherein the second distal surface contacts the first distal surface to depress the depressible member.

The present application also discloses a filtration system comprising a filter manifold and a filter cartridge. In some embodiments, the filter manifold may comprise a bracket and a valve held by the bracket, wherein the valve comprises a fixed portion attached to the bracket and a rotary portion. In one embodiment, the bracket comprises a cartridge support shelf disposed on the bracket in a position below the cartridge lifter when the handle is in the service position. In some embodiments, the filter manifold is provided without a bracket. In such embodiments, the cartridge support shelf may be provided as a part of the fixed portion of the valve. In one embodiment, the filter manifold further comprises a manifold feed port and a manifold filtrate port. In some embodiments, a handle is operatively connected to the rotary portion and comprises a cartridge lifter having one of a camming ramp or a camming lug lifter engagement feature. The handle is rotatable to a service position and a disengaged position, wherein the manifold feed port is blocked by the valve when the handle is in the disengaged position.

In disclosed filtration systems, the filter cartridge may comprise a cartridge feed port, a cartridge filtrate port, and an external cartridge surface having one of a camming lug or a camming ramp for engaging the lifter engagement feature.

In some embodiments, the camming lug comprises a leading edge and a primary surface, wherein the leading edge contacts the camming ramp prior to the primary surface contacting the camming ramp.

In one embodiment, the camming ramp comprises a first ramp portion and a second ramp portion, wherein the first ramp portion advances the camming lug toward the filter manifold at a greater rate than the second ramp portion. In one embodiment, the first ramp portion comprises a linear profile and the second ramp portion comprises a curved profile. In another embodiment, the first and second ramp portions each comprise a curved profile.

In some embodiments, the handle comprises a handle disengagement feature and the filter cartridge comprises a cartridge disengagement feature. In such embodiments, the handle disengagement feature cooperates, as the handle rotates, with the cartridge disengagement feature to assist in pushing the filter cartridge away from the filter manifold during removal of the filter cartridge.

In some embodiments of disclosed filtration systems, the filter cartridge comprises a rigid sump having an interior volume and a disposable filter element. At least a portion of the disposable filter element is positionable within the interior volume. In one embodiment, the external cartridge surface is on the rigid sump. In another embodiment, the external cartridge surface is on the disposable filter element.

In one embodiment of disclosed filtration systems, the valve further comprises a rotation lock connected to the rotary portion. In such embodiments, rotation of the handle may be prevented by the rotation lock when the handle is in the disengaged position. In some embodiments, the rotation lock comprises a depressible member connected to the rotary portion of the valve and protruding through an aperture in the fixed portion of the valve. In one embodiment, the depressible member is depressible from a locking position to an unlocking position. In some embodiments, the filter cartridge further comprises a rotation key, wherein the rotation key depresses the depressible member to the unlocking position.

The present application also discloses methods for servicing the filtration systems described above. In one embodiment, the method comprises the steps of (i) providing the filter cartridge below the filter manifold while the handle is in the disengaged position, (ii) rotating the handle into the service position, thereby causing the cartridge lifter to contact the camming ramp with the camming lug, thereby drawing the filter cartridge toward the filter manifold, (iii) engaging the cartridge feed port to the manifold feed port, (iv) engaging the cartridge filtrate port to the manifold filtrate port, and (v) actuating the valve to unblock the manifold feed port.

In another embodiment, the method comprises the steps of (i) resting the filter cartridge on the cartridge support shelf while the handle is in the disengaged position, (ii) rotating the handle into the service position, thereby causing the cartridge lifter to contact the camming ramp with the camming lug to lift the filter cartridge off of the cartridge support shelf and draw the filter cartridge toward the filter manifold, (iii) engaging the cartridge feed port to the manifold feed port, (iv) engaging the cartridge filtrate port to the manifold filtrate port, and (v) actuating the valve to unblock the manifold feed port.

In another embodiment, the method comprises the steps of (i) providing the filter cartridge below the filter manifold while the handle is in the disengaged position, (ii) contacting the rotation key to the rotation lock, (iii) rotating the handle into the service position, thereby causing the cartridge lifter to contact the camming ramp with the camming lug to draw the filter cartridge toward the filter manifold, (iv) engaging the cartridge feed port to the manifold feed port, (v) engaging the cartridge filtrate port to the manifold filtrate port, and (vi) actuating the valve to unblock the manifold feed port.

Any of the methods described above may further comprise removing the filter cartridge from the manifold by a method comprising the steps of (i) rotating the handle in the opposite direction; (ii) contacting the handle disengagement feature to the cartridge disengagement feature; (iii) continuing to rotate the handle, thereby pushing the filter cartridge away from the manifold.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION OF THE DRAWINGS

Figure 1:
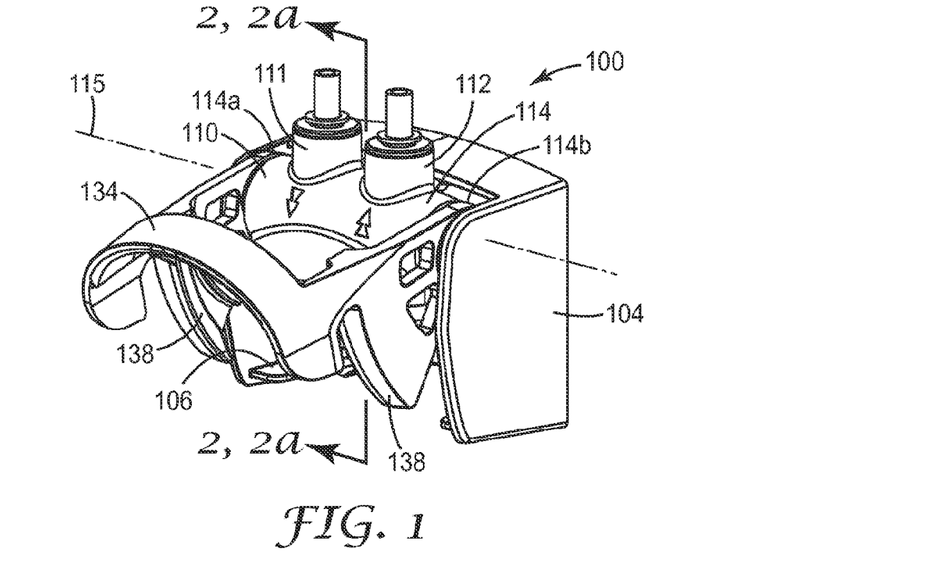
FIG. 1 is a perspective view of a filter manifold.
Figure 1A:
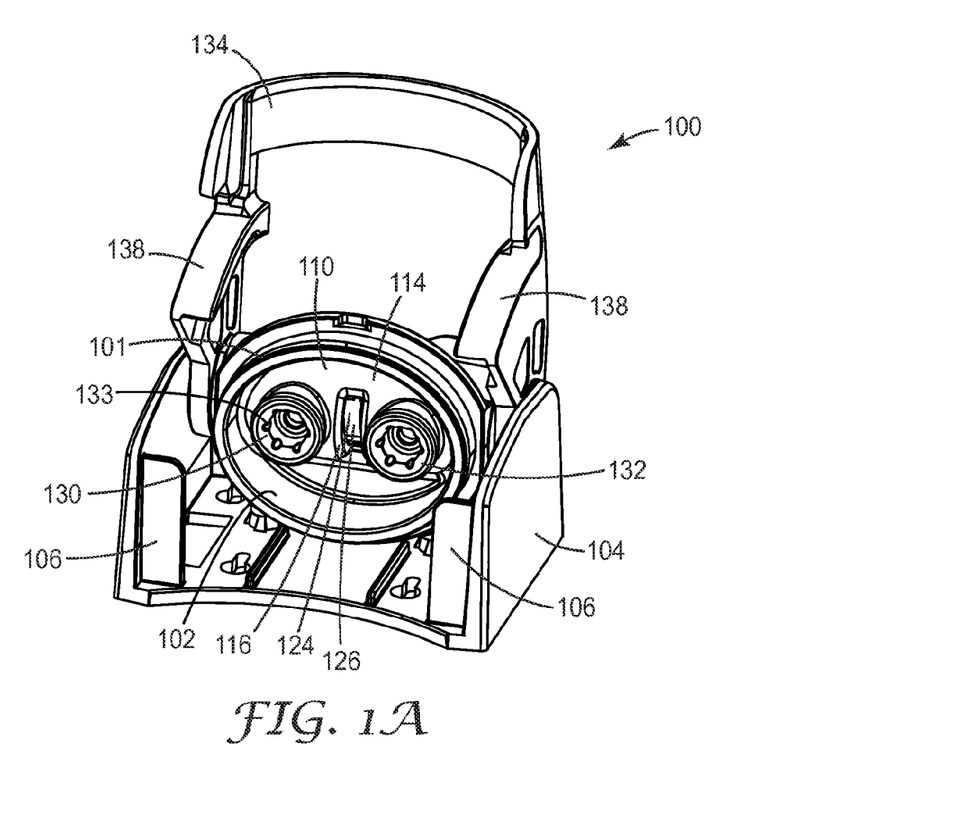
FIG. 1A is a bottom perspective view of the filter manifold of FIG. 1.

FIGS. 1 and 1A depict an exemplary embodiment of a filter manifold 100. Filter manifold 100 typically comprises a bracket 104. Bracket 104 may comprise further mounting structure to enable filter manifold 100 to be affixed to a wall or other suitable backing. Filter manifold 100 further comprises a feed water source 111, a filtrate outlet 112, a valve 110, and a handle 134 having structure thereon for engaging compatible geometry on a filter cartridge, for example, filter cartridge 460, to draw the filter cartridge toward filter manifold 100. In FIGS. 1 and 1A, handle 134 is shown in a locked, or disengaged, position. Valve 110 typically comprises a fixed portion 114 and a rotary portion 218, as shown in greater detail in FIGS. 2 and 2A. Handle 134 is operatively connected to rotary portion 218 of valve 110. In one embodiment, handle 134 comprises a gripping portion that allows a user to actuate handle 134 with one hand and preferably with a single downward stroke.

In some embodiments, filter manifold 100 is provided without bracket 104. In such embodiments, fixed portion 114 of valve 110 may be provided with mounting structure to allow direct mounting of valve 110 to a wall or other backing. Suitable mounting structure includes, for example, raised bosses having a bore therein for accepting a threaded fastener. Other suitable mounting structure includes, for example, male or female snap features for engaging a complimentary snap feature on a wall or other backing.

The various parts of filter manifold 100 as described above and in later described embodiments may be constructed from any suitable material having adequate strength and manufacturability. Examples of suitable materials include polypropylene, polystyrene, nylon, and various polyphenylene ether compounds. It is also envisioned that, in applications requiring greater strength, for example, parts may be constructed of metals such as stainless steel and aluminum.

In some embodiments, filter manifold 100 comprises at least one cartridge support shelf 106. Typically, cartridge support shelf 106 is affixed to bracket 104. In some embodiments, such as shown in FIGS. 1 and 1A, bracket 104 comprises opposing sides, and one cartridge support shelf 106 is disposed on each opposing side of bracket 104. Cartridge support shelf 106 is positioned to support filter cartridge 460 in a staging position prior to assembly or after disassembly of filter cartridge 460 from filter manifold 100. In some embodiments, the staging position is located to allow filter cartridge 460 to rest in a position to cooperate with cartridge lifter 138 on handle 134. In such embodiments, as handle 134 is rotated, cartridge lifter 138 can engage a compatible feature on filter cartridge 460, thereby lifting filter cartridge 460 from cartridge support shelf 106 and drawing filter cartridge 460 toward filter manifold 100. Cartridge support shelf 106 provides a convenient place to rest filter cartridge 460 and also helps ensure proper alignment of filter cartridge 460 for cooperation with cartridge lifter 138. Cartridge support shelf 106 can provide the further function of a hard stop for filter cartridge 460 as it is being removed from filter manifold 100, thereby helping prevent filter cartridge 460 from falling or from otherwise ejecting from filter manifold 100 upon removal under operating pressure.

In embodiments where filter manifold 100 is provided without bracket 104, cartridge support shelf 106 may be provided as a part of fixed portion 114 of valve 110. For example, cartridge support shelf 106 may be integrally molded on one or more protrusions projecting from fixed portion 114. Cartridge support shelf 106 may alternatively be provided as a discrete part that is fastened to fixed portion 114 by suitable fasteners. Examples of suitable fasteners include screws, snaps, rivets, adhesives, and the like. In embodiments where cartridge support shelf 106 is provided as a part of fixed portion 114, it is envisioned that cartridge support shelf 106 is positioned in substantially the same location relative to fixed portion 114 as is shown in FIG. 1, wherein cartridge support shelf 106 is shown as a part of bracket 104.

FIG. 1A depicts filter manifold 100 of FIG. 1 rotated to show the underside thereof. As shown, at least a portion of a depressible member 126 protrudes into an aperture 116 in fixed portion 114 of valve 110. Aperture 116 is flanked on either side by manifold feed port 130 and manifold filtrate port 132. In some embodiments, aperture 116 may be positioned to one side or the other of both manifold feed port 130 and manifold filtrate port 132. Depressible member 126 and aperture 116 are discussed in greater detail with regard to FIGS. 2 and 2A below.

Figure 4:
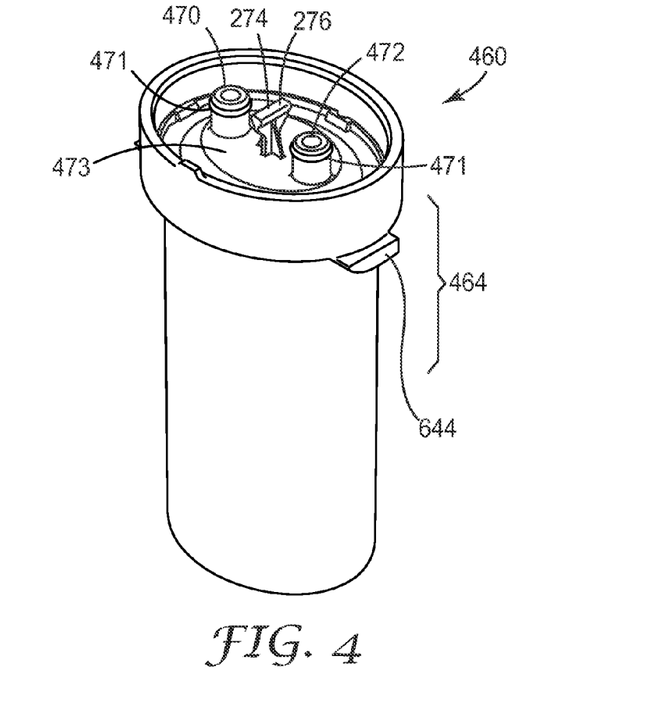
FIG. 4 is a perspective view of a filter cartridge in an assembled state.

In some embodiments, one or both of manifold feed port 130 and manifold filtrate port 132 comprise a vent 133, as shown in FIG. 1A configured to cause a bypass past a seal on one or both of a cartridge feed port 470 and a cartridge filtrate port 472, both shown in FIG. 4, as a filter cartridge is removed from filter manifold 100. In some embodiments, cartridge feed port 470 and cartridge filtrate port 472 each comprise a port sealing member 471, as shown in FIG. 4, to sealingly couple the cartridge feed port 470 to the manifold feed port 130 and the cartridge filtrate port 472 to the manifold filtrate port 132. Port sealing member 471 may comprise, for example, an o-ring, a gasket, or an overmolded elastomeric seal. Vent 133 may comprise a series of vent features. Each vent feature may comprise a scalloped recess on an interior wall of either or both of the manifold feed port 130 and manifold filtrate port 132. Each scalloped recess is configured to cause a bypass past a port sealing member 471 as filter cartridge 460 is removed from filter manifold 100. Any pressurized fluid remaining in filter cartridge 460 can then escape through vent 133 to a lower pressure region before filter cartridge 460 is completely removed from filter manifold 100. In some embodiments, filter cartridge 460 remains held by cartridge lifter 138 at the time a bypass is created and the pressurized fluid is vented. In such embodiments, vent 133 and cartridge lifter 138 work together to prevent rapid, uncontrolled disengagement of the filter cartridge from filter manifold 100.

In some embodiments, a sump sealing member 101 is further provided on one of filter cartridge 460 or filter manifold 100. Sump sealing member 101 sealingly couples filter cartridge 460 to filter manifold 100, thereby isolating an interior connection chamber 102 from an ambient environment. Sump sealing member 101 may comprise, for example, an o-ring, a gasket, or an overmolded elastomeric seal. Sump sealing member 101 is typically positioned to maintain isolation of interior connection chamber 102 during a pressurized fluid bypass through vent 133. In such embodiments, any pressurized fluid that escapes through vent 133 is contained within interior connection chamber 102 prior to complete disengagement of filter cartridge 460 from filter manifold 100.

Figure 2:
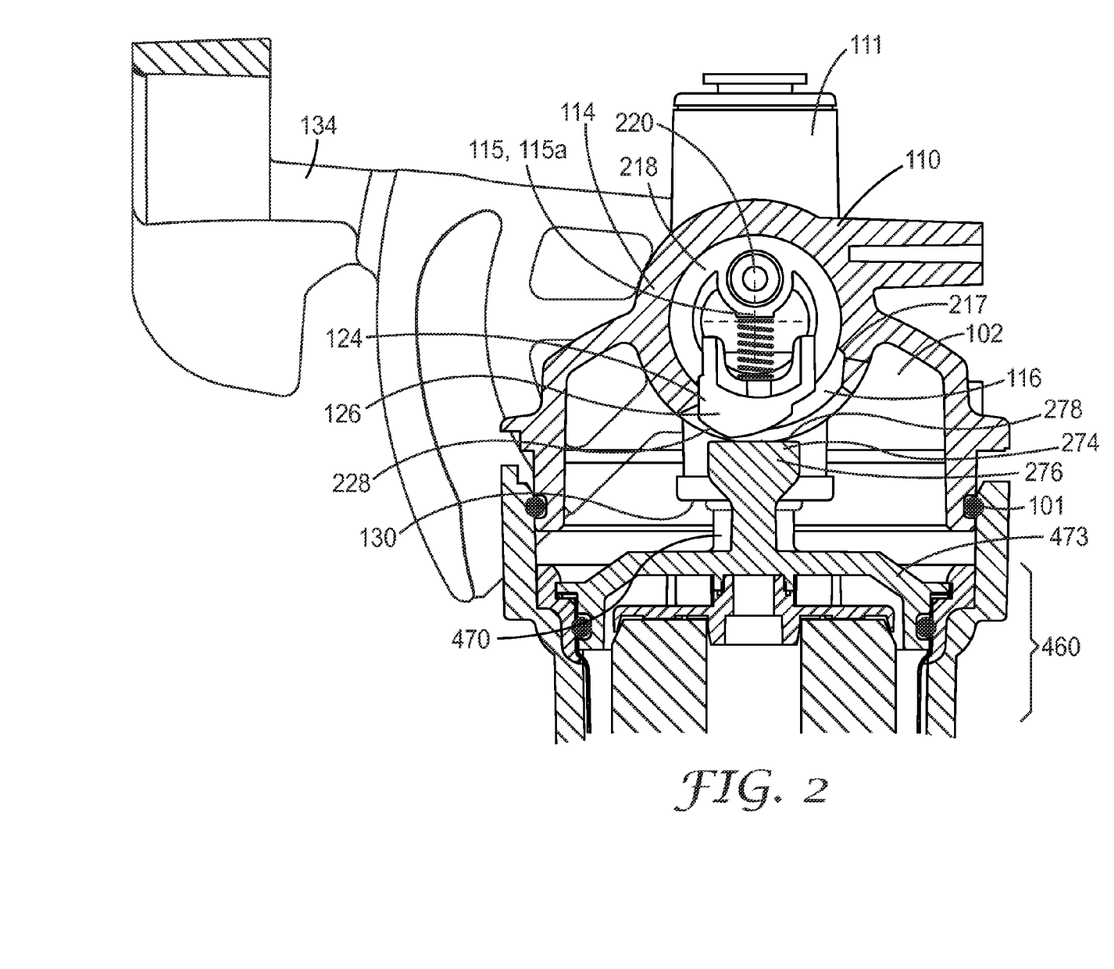
FIG. 2 is a cross-sectional view taken at 2-2 of FIG. 1 of a portion of a filter manifold having a handle and valve in a locked position with a filter cartridge positioned below the filter manifold.
Figure 2A:
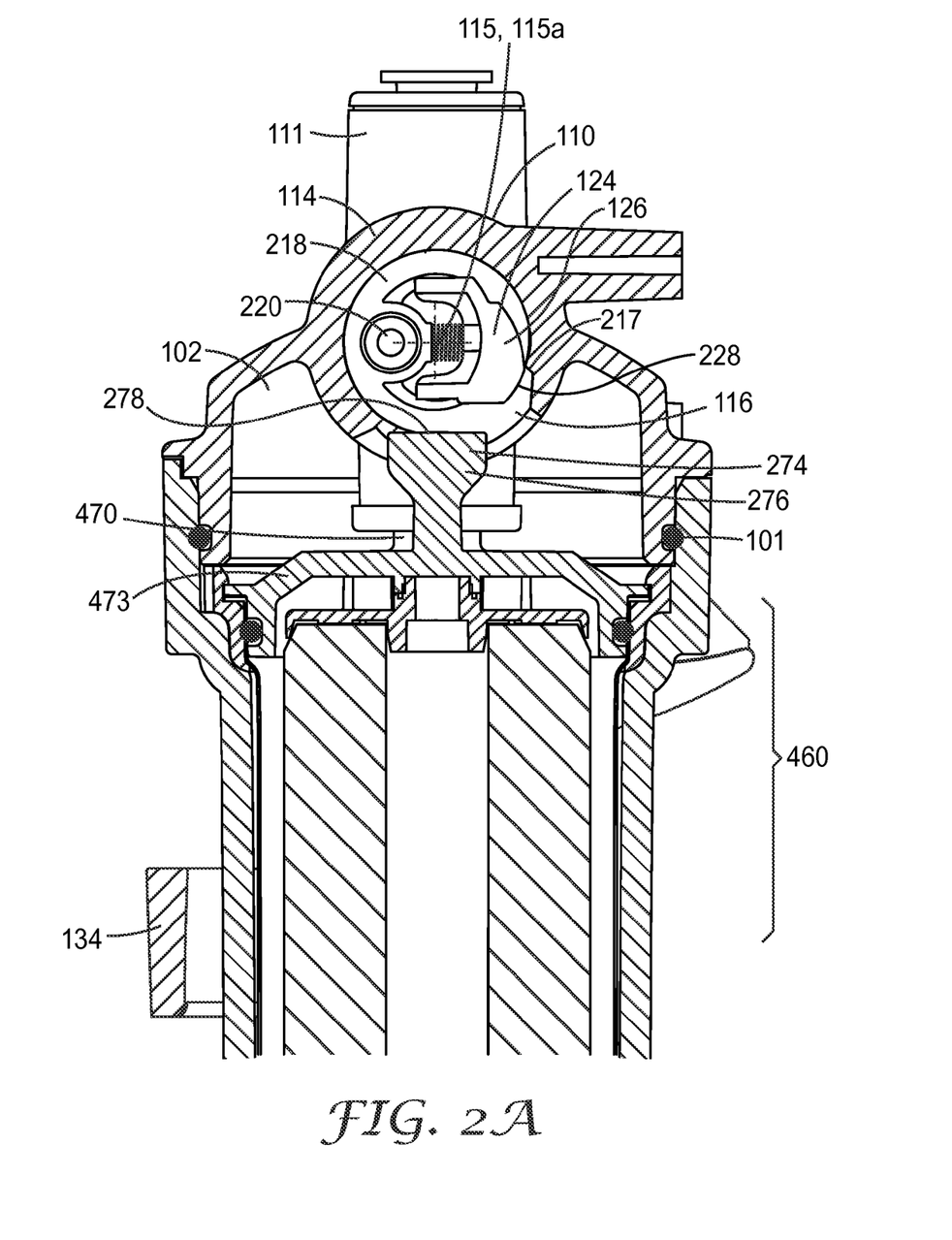
FIG. 2A is a partial cross-sectional view taken at 2A-2A of FIG. 1 showing the assembly of FIG. 2 with the filter cartridge fully installed onto the manifold and the handle and valve in a service position.
Figure 3:
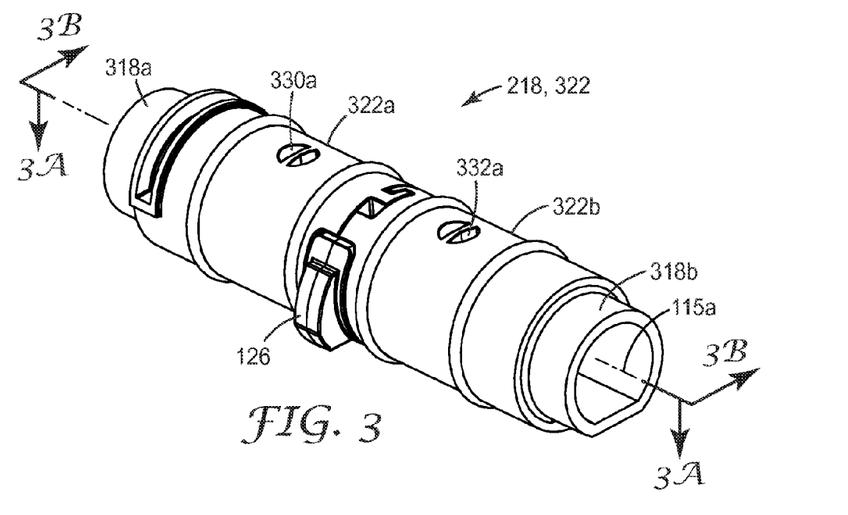
FIG. 3 is a perspective view of a rotary portion of a valve.
Figure 3A:
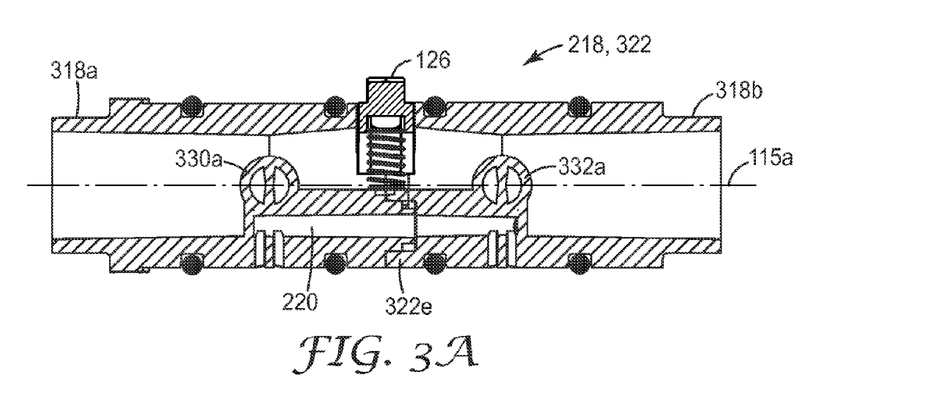
FIG. 3A is a cross-sectional view taken at 3A-3A of FIG. 3 of a rotary portion of a valve.
Figure 3B:
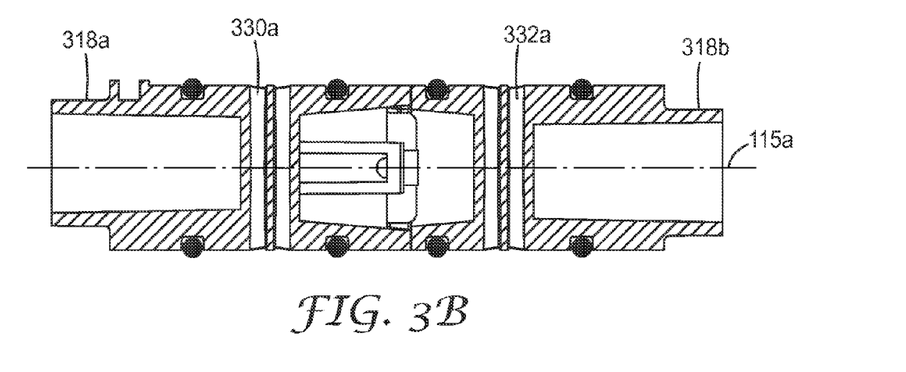
FIG. 3B is a cross-sectional view taken at 3B-3B of FIG. 3 of a rotary portion of a valve.
Figure 3C:
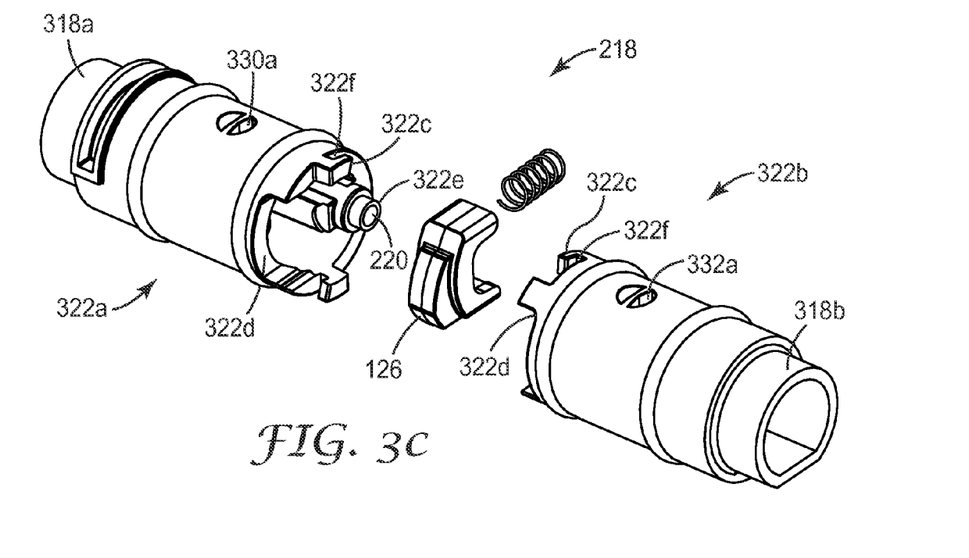
FIG. 3C is an exploded view of a rotary portion of a valve.

FIGS. 2 and 2A depict an exemplary embodiment of a valve 110 in both a locked position (FIG. 2) and an unlocked position (FIG. 2A). Bracket 104 is omitted for clarity. The locked, or disengaged, position corresponds to a state where filter cartridge 460 shown in FIG. 4 is removed. The unlocked position corresponds to a state where filter cartridge 460 is installed. Valve 110 may comprise fixed portion 114 and rotary portion 218. Fixed portion 114 typically comprises a body having a cylindrical bore having a longitudinal axis 115. As shown in FIGS. 2 and 2A, feed water source 111 (along with filtrate outlet 112, not shown) is typically affixed to fixed portion 114. In some embodiments, fixed portion 114 further comprises sump sealing member 101. Rotary portion 218 typically comprises a cylinder having a longitudinal axis 115a as shown in FIG. 3. Fixed portion 114 and rotary portion 218 are nested, and rotary portion 218 rotates with respect to fixed portion 114. Manifold feed port 130 is blocked when rotary portion 218 is in the locked position. Rotation of rotary portion 218 to the unlocked position unblocks manifold feed port 130. In some embodiments, rotary portion 218 is free to rotate throughout a limited arc when in the locked position. In one embodiment, the limited arc corresponds to an angular displacement of rotary portion 218 of about 45 degrees. In another embodiment, the angular displacement is about 30 degrees. In a further embodiment, the angular displacement is about 15 degrees. Typically, manifold feed port 130 remains blocked during rotation through the limited arc. Allowing the handle to travel through the limited arc permits the cartridge lifter 138 to partially engage filter cartridge 460 without unblocking manifold feed port 130. This feature can ease service by helping to hold filter cartridge 460 in place during installation and removal. In some embodiments, this feature works together with cartridge support shelf 106 to help hold filter cartridge 460 in place during installation and removal.

As shown in FIGS. 2 and 2A, a bypass channel 220 may be formed or otherwise disposed in rotary portion 218. In such embodiments, bypass channel 220 fluidly connects feed water source 111 to the filtrate outlet 112 of filter manifold 100 when rotary portion 218 is in the locked position. When rotary portion 218 is in the unlocked position, bypass channel 220 is moved out of fluid communication with feed water source 111 and filtrate outlet 112. Bypass channel 220 can allow a fluid to continue to flow through filter manifold 100 when filter cartridge 460 is removed, while fluid is directed through filter cartridge 460 when filter cartridge 460 is installed.

In some embodiments, rotary portion 218 is prevented from rotating to the unlocked position by rotation lock 124. Rotation lock 124 may comprise a depressible member 126 extending through at least a portion of aperture 116 in fixed portion 114. Interference between depressible member 126 and a first wall 217 of aperture 116 prevents rotary portion 218 from rotating beyond the limited arc. In some embodiments, the depressible member 126 comprises a spring-loaded pin. In some embodiments, depressible member 126 comprises a solid pin portion having first distal surface 228 backed by a coil spring. It is envisioned that other resilient members may be used to back a solid pin portion of depressible member 126. It is also envisioned that depressible member 126 can be constructed entirely of, for example, a rubber or other resilient material. Depressible member 126 may alternatively comprise a coil spring.

In some embodiments, depressible member 126 comprises a first distal surface 228 facing in a direction orthogonal to longitudinal axis 115a of rotary portion 218. When depressible member 126 is depressed to a sufficient extent, rotary portion 218 is free to rotate past the limited arc and past first wall 217, whereupon first distal surface 228 of depressible member 126 slides through and past aperture 116 and along an inner cylinder wall of fixed portion 114. When rotary portion 218 is rotated to the unlocked position, manifold feed port 130 is unblocked. In one embodiment, the maximum angular displacement of rotary portion 218 in rotating from a locked position to an unlocked position is about 90 degrees. In another embodiment, the maximum angular displacement is about 120 degrees. In another embodiment, the maximum angular displacement is about 60 degrees. The maximum angular displacement may be chosen to provide the desired stroke length for handle 134 to maximize ergonomic benefit for single-handed service of filter cartridge 460.

Typically, rotation lock 124 is depressible by a rotation key 274 on filter cartridge 460, as shown in FIGS. 2 and 2A. When filter cartridge 460 is installed into filter manifold 100, rotation key 274 depresses rotation lock 124, thereby allowing rotary portion 218 to rotate from the locked position to the unlocked position. In some embodiments, rotation key 274 comprises a protrusion 276 having a second distal surface 278 thereon. In such embodiments, second distal surface 278 contacts first distal surface 228 to depress rotation lock 124. In one embodiment, rotation key 274 is disposed on filter head 473 of filter cartridge 460. In some embodiments, rotation key 274 is positioned on filter head 473 between cartridge feed port 470 and cartridge filtrate port 472 shown in FIG. 4. In some embodiments, rotation key 274 is offset from cartridge feed port 470 and cartridge filtrate port 472 to further work as an alignment feature such that filter cartridge 460 may only be installed into filter manifold 100 in a single orientation.

FIGS. 3, 3A, 3B, and 3C show an exemplary embodiment of rotary portion 218 of valve 110. In some embodiments, rotary portion 218 comprises a two-part shell 322. Two-part shell 322 comprises first cylindrical portion 322a and second cylindrical portion 322b. First cylindrical portion 322a comprises feed channel 330a, and second cylindrical portion 322b comprises filtrate channel 332a. In one embodiment, first cylindrical portion 322a and second cylindrical portion 322b each comprise a portion of bypass channel 220 and a fluid connector 322e for fluidly connecting the two portions of bypass channel 220. Bypass channel 220 is configured to fluidly connect feed water source 111 to filtrate outlet 112. First cylindrical portion 322a and second cylindrical portion 322b may each have a connection end 322c comprising a recess 322d therein for locating depressible member 126. Alternatively, recess 322d may be formed in only of the first cylindrical portion 322a or second cylindrical portion 322b. Each connection end 322c may further comprise a bayonet connection 322f. When first cylindrical portion 322a and second cylindrical portion 322b are connected to each other, in applicable embodiments, fluid connectors 322e fluidly connect the two portions of bypass channel 220. Rotary portion 218 may be provided as two-part shell 322 instead of a single part in order to include internal features such as bypass channel 220. Absent a two-part construction, molding or machining of such internal features present difficult challenges, as would be understood by one skilled in the art. Applicants resolved the difficult challenges by providing rotary portion 218 as two-part shell 322 that may be manufactured more easily and at a lower cost than a single part.

Figure 6:
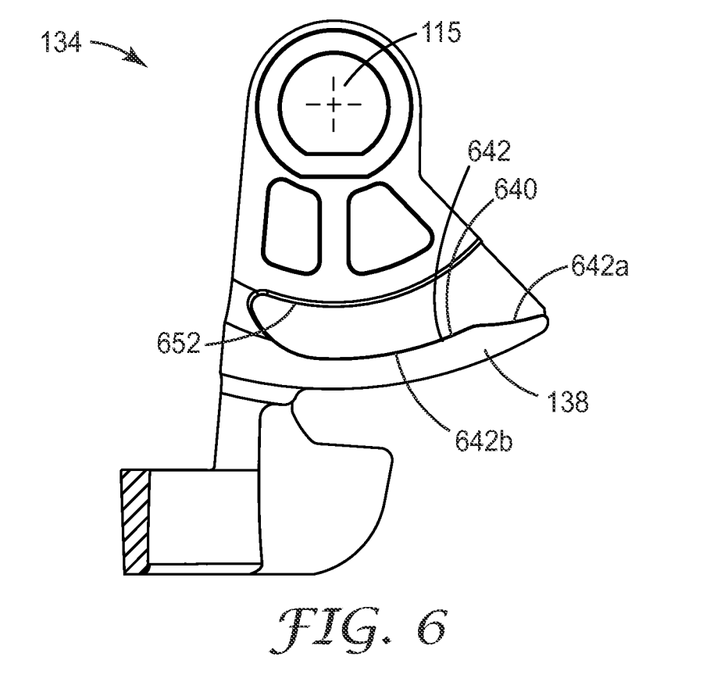
FIG. 6 is a cross-sectional view taken at 6-6 of FIG. 5 of a handle having a camming ramp.

In some embodiments, rotary portion 218 comprises a first axial extension 318a and a second axial extension 318b configured to extend beyond respective first and second ends 114a and 114b of fixed portion 114. In embodiments where rotary portion 218 comprises two-part shell 322, first axial extension 318a is disposed on first cylindrical portion 322a and second axial extension 318b is disposed on second cylindrical portion 322b. First and second axial extensions 318a and 318b can be operatively connected to handle 134 to allow handle 134 to actuate valve 110. In the context of the present application, Applicants define the term "operatively connected" to mean "connected in a way to perform a designated function." Accordingly, as used above, first and second axial extensions 318a and 318b are connected to handle 134 to perform the function of actuating of valve 110. For example, handle 134 and first and second axial extensions 318a and 318b may be directly affixed to one another. As shown in FIG. 3, first and second axial extensions 318a and 318b may comprise a flat outer surface portion. As shown in FIG. 6, handle 134 may comprise two sides each comprising a cylindrical bore having a flat inner surface portion. Each bore on handle 134 may be pressed over respective first and second axial extensions 318a and 318b with the flat inner and outer surface portions mating against one another. Such assembly may further be glued, welded, or otherwise retained.

In another embodiment, handle 134 and first and second axial extensions 318a and 318b may be connected through a linkage. In another embodiment, handle 134 and first and second axial extensions 318a and 318b may be connected through a gear train.

FIG. 4 depicts an exemplary embodiment of a filter cartridge 460. In some embodiments, filter cartridge 460 comprises a cartridge feed port 470, a cartridge filtrate port 472, a rotation key 274, and a filtration media surrounded by a pressure vessel having a filter head 473 affixed to one end thereof. In one embodiment, cartridge feed port 470, cartridge filtrate port 472, and rotation key 274 are disposed on filter head 473. In some embodiments, cartridge feed port 470 and cartridge filtrate port 472 each comprise a port sealing member 471. Filter cartridge 460 comprises an external cartridge surface 464. In some embodiments, at least one camming lug 644 or at least one camming ramp 642 as shown in FIG. 6 is disposed on external cartridge surface 464. While the embodiment depicted in FIG. 4 shows a camming lug disposed near filter head 473, it is envisioned that a camming lug or camming ramp may be disposed in any location on external cartridge surface 464. Filter head 473 and external cartridge surface 464 may be constructed of any suitable rigid material. Examples of suitable materials include polypropylene, polystyrene, nylon, and various polyphenylene ether compounds. It is also envisioned that, in applications requiring greater strength, for example, one or both of filter head 473 and external cartridge surface 464 may be constructed of metals such as stainless steel and aluminum.

Cartridge feed port 470 is fluidly connected to an upstream portion of the filtration media, while cartridge filtrate port 472 is fluidly connected to a downstream portion of the filtration media. Accordingly, in typical embodiments, any fluid entering filter cartridge 460 through cartridge feed port 470 must flow through the filtration media to reach cartridge filtrate port 472. Suitable filtration media include, for example, carbon blocks, pleated media, nonwovens, membranes, depth filtration media, and porous polymer blocks.

In some embodiments, filter cartridge 460 is generally elliptical in cross-section, allowing it to consume less depth than, for example, a cylindrical filter cartridge. In such embodiments, the filtration media may also be provided with a generally elliptical cross-section. A corresponding cartridge mating portion of filter manifold 100 may also be provided with a generally elliptical cross section. In applications where a filtration system according to the present disclosure is mounted on a wall, such elliptical geometry allows the filtration system to protrude from the wall a lesser distance than would a comparable cylindrical geometry with the same filtration capacity.

Figure 5:
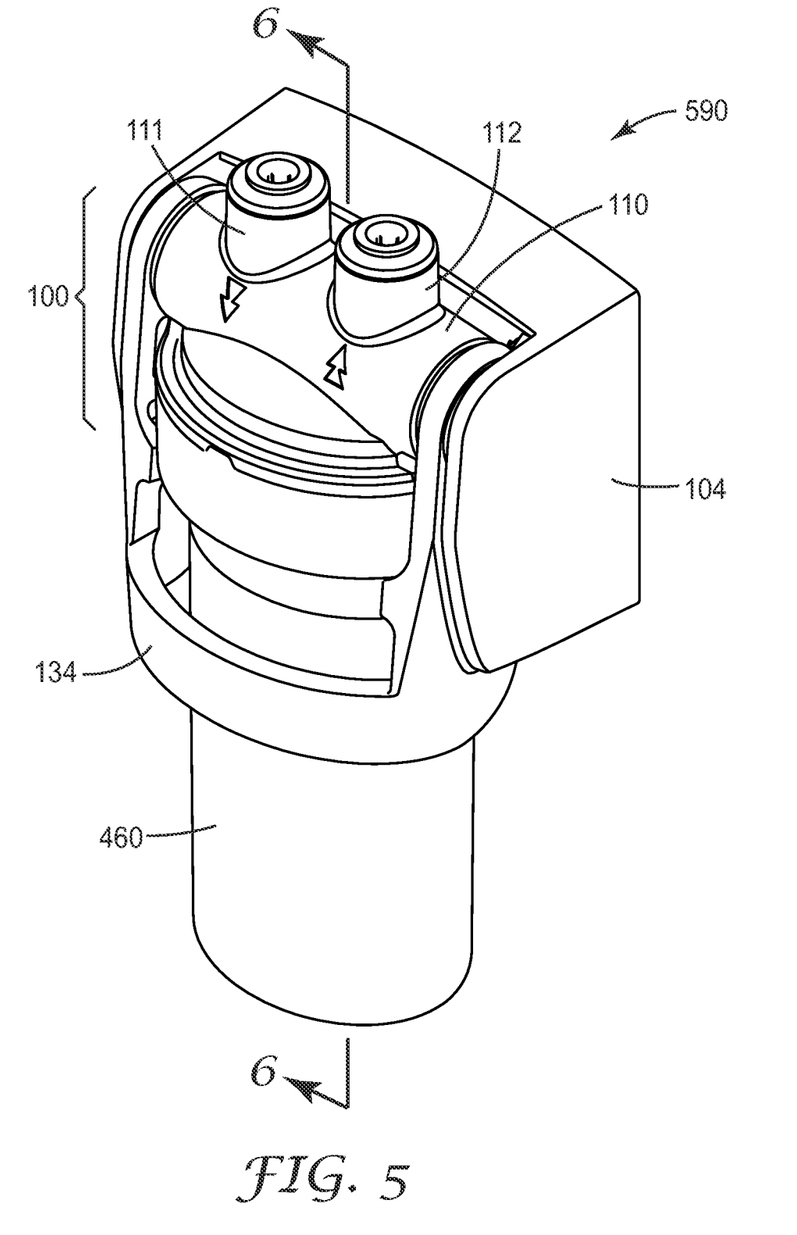
FIG. 5 is a perspective view of a filtration system with a filter cartridge installed and a handle in a service position.
Figure 5A:
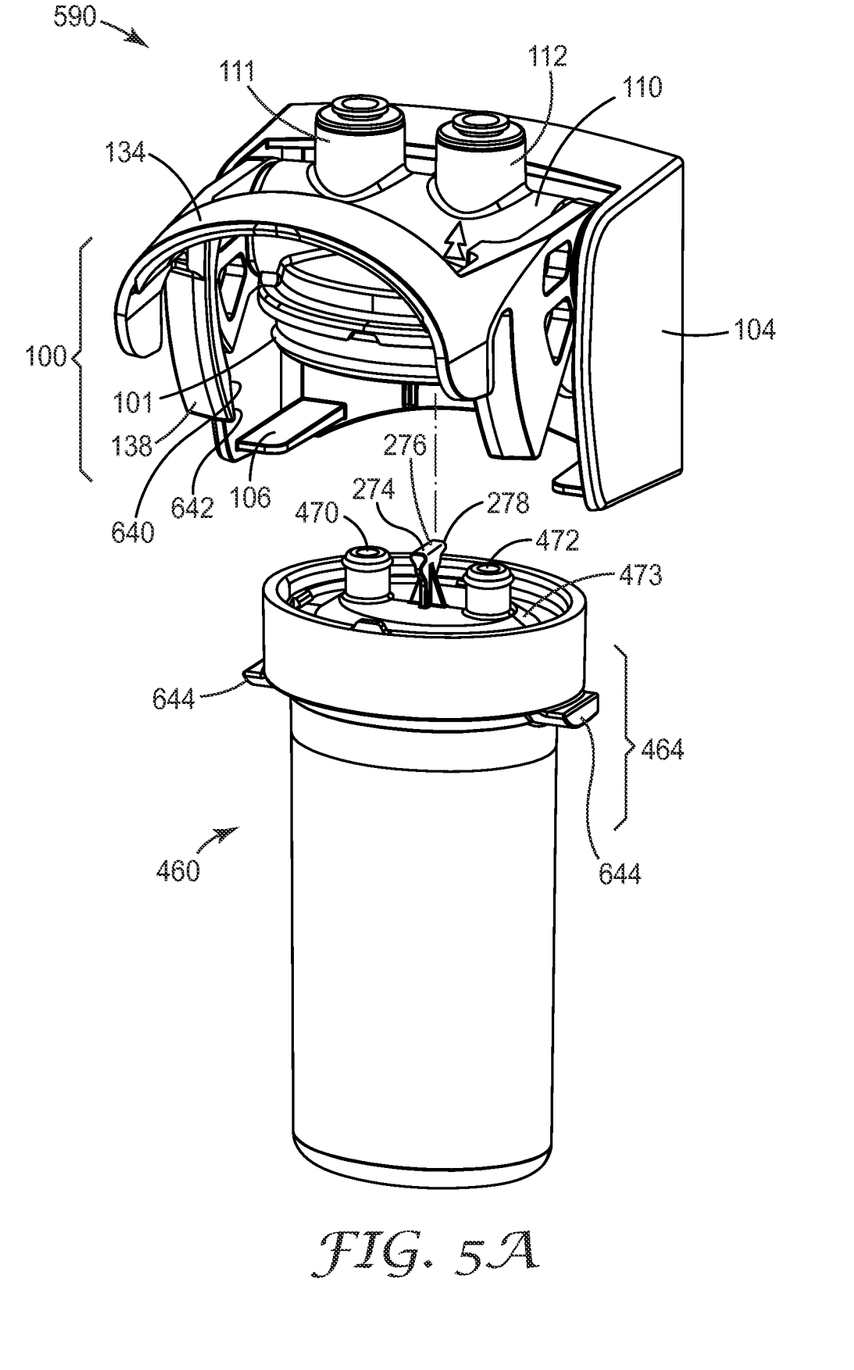
FIG. 5A shows a filtration system with the filter cartridge removed and the handle in a locked position.

FIGS. 5 and 5A depict an exemplary embodiment of a filtration system 590 in both a service state and a disassembled state. Typically, filtration system 590 comprises a filter manifold 100 and a filter cartridge 460. In FIG. 5, filter cartridge 460 is installed and handle 134 is in an unlocked, or service, position. In FIG. 5A, filter cartridge 460 is removed and handle 134 is in a locked, or disengaged, position. In one embodiment, filter manifold 100 comprises bracket 104, handle 134, valve 110, cartridge support shelf 106, a manifold feed port 130 as shown in FIG. 1A, a manifold filtrate port 132 as shown in FIG. 1A, a feed water source 111, and a filtrate outlet 112. As discussed above, in some embodiments, filter manifold 100 is provided without bracket 104. In such embodiments, cartridge support shelf 106 may be provided as a part of fixed portion 114, as discussed above. In some embodiments, filter manifold 100 comprises sump sealing member 101. In one embodiment, sump sealing member 101 is provided on fixed portion 114 of valve 110. Handle 134 further comprises cartridge lifter 138 having one of a camming ramp 642 or camming lug 644 lifter engagement feature 640. In one embodiment, filter cartridge 460 comprises external cartridge surface 464, cartridge feed port 470, cartridge filtrate port 472, port sealing members 471, rotation key 274, and at least one camming lug 644 or camming ramp 642 for engaging lifter engagement feature 640. In some embodiments, rotation key 274 comprises a protrusion 276 having second distal surface 278.

It is envisioned that external cartridge surface 464 and cartridge lifter 138 comprise complementary engagement features. For example, lifter engagement feature 640 may comprise a camming ramp 642 and external cartridge surface 464 may comprise a camming lug 644. Similarly, lifter engagement feature 640 may comprise a camming lug 644 and external cartridge surface 464 may comprise a camming ramp 642. It is also envisioned that handle 134 may comprise more than one cartridge lifter 138, and that the cartridge lifters 138 may comprise the same or different types of lifter engagement features 640. For example, handle 134 may comprise two opposing cartridge lifters 138, one for each side of filter cartridge 460. One cartridge lifter 138 may comprise a camming ramp 642, while an opposing cartridge lifter 138 may comprise a camming lug 644. In such embodiments, external cartridge surface 464 comprises a camming lug 644 corresponding to the camming ramp 642 lifter engagement feature 640 and a camming ramp 642 corresponding to the camming lug 644 lifter engagement feature 640.

In one embodiment, filtration system 590 is assembled by (i) providing filter cartridge 460 below filter manifold 100 while handle 134 is in the disengaged position, (ii) rotating handle 134 into the service position, thereby causing cartridge lifter 138 to contact camming ramp 642 with camming lug 644, thereby drawing filter cartridge 460 toward filter manifold 100, (iii) engaging cartridge feed port 470 to manifold feed port 130, (iv) engaging cartridge filtrate port 472 to the manifold filtrate port 132, and (v) actuating valve 110 to unblock manifold feed port 130.

In another embodiment, filtration system 590 is assembled by (i) resting filter cartridge 460 in a staging position on cartridge support shelf 106 while handle 134 is in the disengaged position, (ii) rotating handle 134 into the service position, thereby causing cartridge lifter 138 to contact camming ramp 642 with camming lug 644 to lift filter cartridge 460 off of cartridge support shelf 106 and draw filter cartridge 460 toward filter manifold 100, (iii) engaging cartridge feed port 470 to manifold feed port 130, (iv) engaging cartridge filtrate port 472 to manifold filtrate port 132, and (v) actuating valve 110 to unblock manifold feed port 130.

In another embodiment, filtration system 590 is assembled by (i) providing filter cartridge 460 below filter manifold 100 while handle 134 is in the disengaged position, (ii) contacting rotation key 274 to rotation lock 124 as shown in FIG. 1A, (iii) rotating handle 134 into the service position, thereby causing cartridge lifter 138 to contact camming ramp 642 with camming lug 644 to draw filter cartridge 460 toward filter manifold 100, (iv) engaging cartridge feed port 470 to manifold feed port 130, (v) engaging cartridge filtrate port 472 to manifold filtrate port 132, and (vi) actuating valve 110 to unblock manifold feed port 130.

In another embodiment, filtration system 590 is assembled by (i) providing filter cartridge 460 below filter manifold 100 while handle 134 is in the disengaged position and while bypass channel 220 fluidly connects a feed water source 111 and a filtrate outlet 512, (ii) rotating handle 134 into the service position, thereby causing cartridge lifter 138 to contact camming ramp 642 with camming lug 644, thereby drawing filter cartridge 460 toward filter manifold 100, (iii) engaging cartridge feed port 470 to manifold feed port 130, (iv) engaging cartridge filtrate port 472 to the manifold filtrate port 132, (v) moving bypass channel 220 out of fluid connection with the feed water source 111 and a filtrate outlet 112, and (vi) actuating valve 110 to unblock manifold feed port 130.

It is to be understood that some steps described in the above methods need not be sequential. For example, in a typical embodiment, engaging cartridge feed port 470 to manifold feed port 130 as shown in FIG. 1A occurs substantially simultaneously with engaging cartridge filtrate port 472 to manifold filtrate port 132 as shown in FIG. 1A. It is also to be understood that steps from the above-described methods are not exclusive to the embodiments in which they are described. For example, the step of resting filter cartridge 460 in a staging position on cartridge support shelf 106 while handle 134 is in the disengaged position may be combined in the same method with contacting rotation key 274 to rotation lock 124. Other method steps may be similarly combined.

FIG. 6 depicts a cross-sectional view of a handle 134 having a camming ramp 642 lifter engagement feature 640 disposed on cartridge lifter 138. In some embodiments, camming ramp 642 comprises first ramp portion 642*a* and second ramp portion 642*b*. In one embodiment, first ramp portion 642*a* has a greater slope than second ramp portion 642*b*. In such embodiments, engagement of filter cartridge 460 to filter manifold 100 may be made by the steps set forth as follows. As handle 134 begins to rotate to allow cartridge lifter 138 to engage filter cartridge 460, first ramp portion 642*a* can engage camming lug 644 to quickly lift filter cartridge 460 from cartridge support shelf 106 until sump sealing member 101 sealingly couples filter cartridge 460 to filter manifold 100. At such point in the engagement process, cartridge feed port 470 is partially engaged with manifold feed port 130 and cartridge filtrate port is partially engaged with manifold filtrate port 132, with vent 133 creating a bypass past each port sealing member 471. Then, upon further rotation of handle 134, camming lug 644 transitions to contact second ramp portion 642*b*, whereupon filter cartridge 460 is lifted more gradually. The more gradual lifting allows a more precise positioning of filter cartridge 460 in filter manifold 100 with respect to the angular position of rotary portion 218. It may be important, for example, that manifold feed port 130 remains blocked until each port sealing member 471 has moved beyond vent 133 to create a complete seal. After such seal is created, handle 134 continues to rotate, thereby allowing camming lug 644 to continue to slide upon second ramp portion 642*b* until filter cartridge 460 is fully seated against filter manifold 100 and manifold feed port 130 is unblocked. First and second ramp portions 642*a* and 642*b* may comprise a linear profile or a curved profile. A camming ramp may alternatively be disposed on external cartridge surface 464.

Figure 6A:
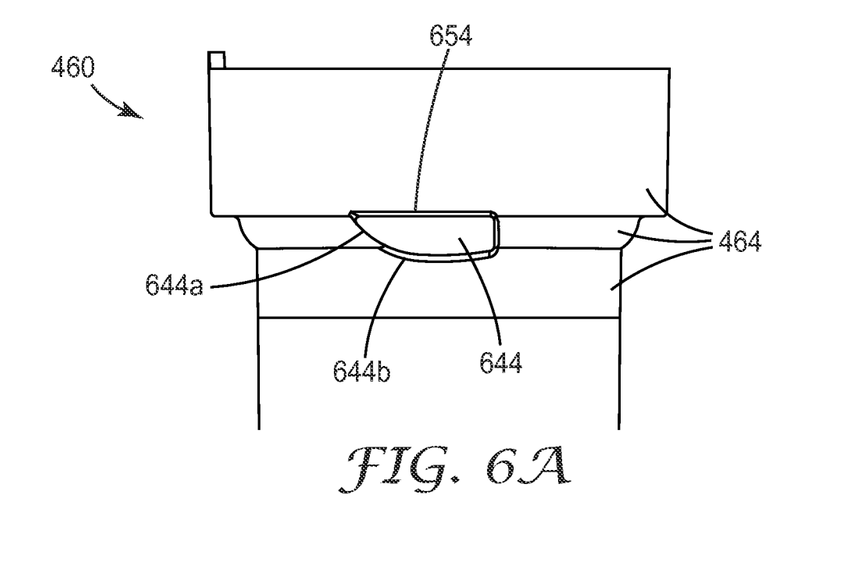
FIG. 6A shows a camming lug on a filter cartridge.

FIG. 6A shows a portion of a filter cartridge 460 having a camming lug 644 for engaging lifter engagement feature 640, wherein camming lug 644 is disposed on external cartridge surface 464. In some embodiments, camming lug 644 comprises leading edge 644*a* and primary surface 644*b*. In such embodiments, leading edge 644*a* may slidingly cooperate with first ramp portion 642*a* to assist with quickly lifting filter cartridge 460 from cartridge support shelf 106, while primary surface 644*b* may slidingly cooperate with second ramp portion 642*b* to more gradually and precisely engage filter cartridge 460 to filter manifold 100. A camming lug may alternatively be disposed on lifter engagement feature 640.

In some embodiments, engagement of camming ramp 642 with camming lug 644 comprises a two-step process. First, as handle 134 rotates counter-clockwise from a disengaged position into a service position as shown in FIG. 6, first ramp portion 642*a* contacts leading edge 644*a*, thereby drawing filter cartridge 460 toward filter manifold 100. Second, as handle 134 continues to rotate, second ramp portion 642*b* contacts primary surface 644*b*, thereby continuing to draw filter cartridge 460 toward filter manifold 100. In embodiments where first ramp portion 642*a* has a greater slope than second ramp portion 642*b*, filter cartridge 460 is drawn toward filter manifold 100 at a greater rate during step one than during step two. Along with the benefits described above, such a two-step process can allow (i) a relatively quick sealing of filter cartridge 460 to filter manifold 100 during the first step, thereby helping to prevent any fluid from escaping filtration system 590 during filter cartridge installation, while (ii) allowing, during the second step, a more gradual and precise timewise interaction between rotary portion 218 and filter cartridge 460 as filter cartridge 460 is fully seated against filter manifold 100 and manifold feed port 130 is unblocked.

In some embodiments, handle 134 further comprises a handle disengagement feature 652. As shown in FIG. 6, handle disengagement feature 652 may comprise a camming surface positioned in a location opposing camming ramp 642 lifter engagement feature 640. Where such embodiments are employed, camming lug 644 on external cartridge surface 464 may comprise a cartridge disengagement feature 654. As shown in FIG. 6A, cartridge disengagement feature 654 may comprise a camming surface positioned in a location opposing primary surface 644*b*. Handle disengagement feature 652 and cartridge disengagement feature 654 can cooperate to assist in removal of filter cartridge 460 from filter manifold 100 when handle 134 is rotated in a clockwise direction as shown in FIG. 6. As handle 134 is rotated in a clockwise direction, handle disengagement feature 652 contacts cartridge disengagement feature 654 to push filter cartridge 460 away from filter manifold 100. This combination of disengagement features can ease user removal of filter cartridge 460 from filter manifold 100 by using mechanical advantage gained by actuating handle 134 to assist in decoupling each port sealing member 471 from respective manifold feed port 130 and manifold filtrate port 132. Such assistance can be beneficial where, for example, sealing members such as o-rings have temporarily "set" due to compressed for extended periods of time, causing them to stick to the surface they are sealed against.

Figure 7:
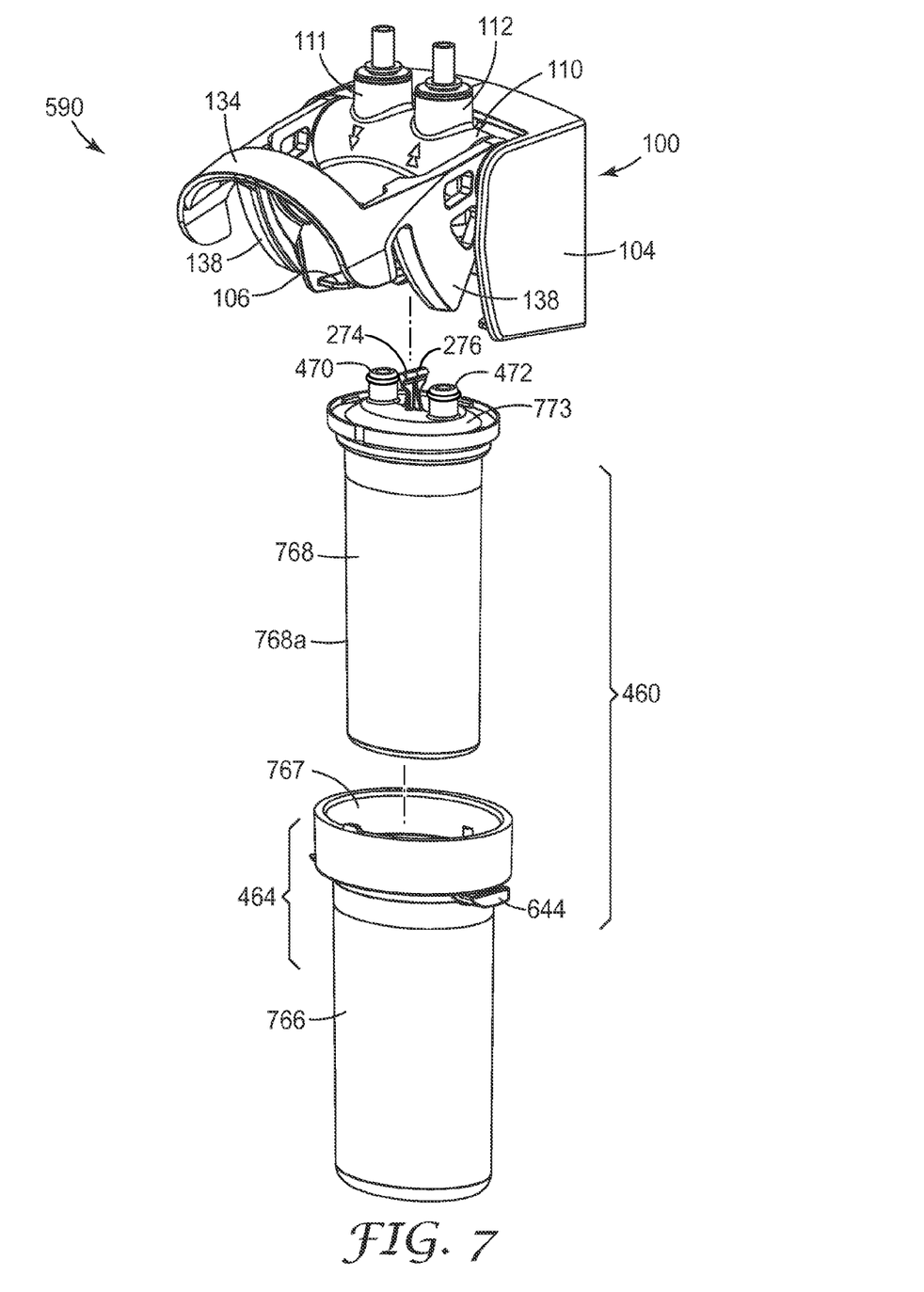
FIG. 7 is a perspective view of a filtration system with the filter cartridge removed and the handle in a locked position, wherein the filter cartridge comprises a disposable filter element and a rigid sump.

FIG. 7 shows an exemplary embodiment of a filtration system 590 in a disassembled state, wherein filter cartridge 460 comprises disposable filter element 768 and rigid sump 766 having interior volume 767. At least a portion of disposable filter element 768 is positionable within interior volume 767. In some embodiments, rigid sump 766 is reused each time disposable filter element 768 is replaced. In such embodiments, a reduction in environmental waste can be realized as less material may be discarded upon filter disposable filter element 768 replacement.

In some embodiments, disposable filter element 768 comprises cartridge feed port 470, cartridge filtrate port 472, rotation key 274, and a filtration media surrounded by casing 768*a* having filter head 773 affixed to one end thereof. In one embodiment, cartridge feed port 470, cartridge filtrate port 472, and rotation key 274 are disposed on filter head 773. Casing 768*a* comprises an impermeable material. In some embodiments, casing 768*a* comprises a flexible impermeable material, for example, low-density polyethylene. Typically, filter head 773 comprises a relatively rigid material as compared to casing 768*a*. Filter head 773 may be constructed of any suitable rigid material. Examples of suitable materials include polypropylene, polystyrene, nylon, and various polyphenylene ether compounds.

In some embodiments, rigid sump 766 is configured to be a pressure vessel that is designed to withstand greater operating pressure than is casing 768a. Rigid sump 766 may be constructed of any suitable rigid material. Examples of suitable materials include polypropylene, polystyrene, nylon, and various polyphenylene ether compounds. It is also envisioned that, in applications requiring greater strength, for example, rigid sump 766 may be constructed of metals such as stainless steel and aluminum. When a typical embodiment of filtration system 590 is assembled and placed under operating pressure, casing 768a bears against a sidewall of interior volume 767 of rigid sump 766. Because casing 768a need not be capable of withstanding the same pressure as rigid sump 766, disposable filter element 768 can be constructed with much less material than would otherwise be necessary. Accordingly, less material is disposed of each time disposable filter element 768 is replaced. Casing 768a provides a further advantage of preventing interior volume 767 from becoming wetted with feed fluid. Accordingly, any required cleaning of rigid sump 766 can be reduced or eliminated.

It is envisioned that external cartridge surface 464 may be a part of either rigid sump 766 or disposable filter element 768. Typically, however, external cartridge surface 464 is a part of rigid sump 766.

In embodiments where filter cartridge 460 comprises disposable filter element 768 and rigid sump 766, rotation key 274 is typically disposed on filter head 773. Accordingly, if an empty rigid sump 766 is placed onto filter manifold 100, rotation key 274 will not depress rotation lock 124 shown in FIG. 1A, and handle 134 will be prevented from rotating into the service position. Because handle 134 will not rotate into the service position, manifold feed port 130 shown in FIG. 1A will remain blocked. In such embodiments, filtration system 590 will only allow unblocking of manifold feed port 130 when a compatible disposable filter element 768 is installed in the rigid sump 766 before installation of filter cartridge 460 onto filter manifold 100. In such embodiments, a user or service technician is prevented from mistakenly omitting disposable filter element 768 when re-installing rigid sump 766. Accordingly, in such embodiments, the user can be assured that filtration system 590 is performing a filtering function if rigid sump 766 is installed and handle 134 is in the service position.

Various modifications and alterations of the invention will be apparent to those skilled in the art without departing from the spirit and scope of the invention. It should be understood that the invention is not limited to illustrative embodiments set forth herein.

What is claimed is:

1. A filter manifold comprising:
a valve comprising a fixed portion and a rotary portion arranged in the fixed portion;
a manifold feed port and a manifold filtrate port;
a handle operatively connected to the rotary portion, the handle comprising a cartridge lifter and a handle disengagement feature comprising a camming surface positioned opposite the cartridge lifter, the handle being rotatable to a service position and a disengaged position, wherein the manifold feed port is blocked by the valve or is open to a bypass channel when the handle is in the disengaged position, and the manifold feed is unblocked by the valve or is blocked to the bypass channel when the handle is in the service position;
wherein upon movement to the disengaged position, the handle disengagement feature pushes a filter cartridge in a direction away from the manifold such that the filter cartridge is fully disengaged.

2. The filter manifold of claim 1 further comprising a rotation lock connected to the rotary portion, wherein the rotation lock comprises a depressible member connected to the rotary portion of the valve and protruding through an aperture in the fixed portion of the valve and depressible from a locking position to an unlocking position.

3. The filter manifold of claim 2 wherein the depressible member protrudes through the aperture when in the locking position and is recessed within the fixed portion of the valve when in the unlocking position.

4. The filter manifold of claim 3 wherein the depressible member is in the unlocking position when the handle is in the service position.

5. The filter manifold of claim 1 wherein the rotary portion of the valve comprises the bypass channel fluidly connecting the manifold feed port to the manifold filtrate port when the handle is in the locked position.

6. The filter manifold of claim 1 wherein the cartridge lifter comprises a lifter engagement feature selected from the group consisting of a camming ramp and a camming lug.

7. The filter manifold of claim 2 further comprising a filter cartridge having a cartridge feed port, a cartridge filtrate port, and a rotation key, wherein the rotation key depresses the depressible member to the unlocking position.

8. The filter manifold of claim 7 wherein the depressible member comprises a first distal surface and the rotation key comprises a protrusion from the filter cartridge, the protrusion having a second distal surface, wherein the second distal surface contacts the first distal surface to depress the depressible member.

9. The filter manifold of claim 1 wherein the fixed portion of the valve comprises a longitudinal axis, a first end oriented along the longitudinal axis, and a second end opposing the first end, wherein a first axial extension of the rotary portion protrudes from the first end, wherein a second axial extension of the rotary portion protrudes from the second end, and wherein the handle is affixed to the first and second axial extensions.

10. The filter manifold of claim 1 further comprising:
a bracket, wherein the valve is held by the bracket, wherein the fixed portion is attached to the bracket; and
a cartridge support shelf disposed on the bracket in a position below the cartridge lifter when the handle is in the service position.

11. A filtration system comprising:
a filter manifold and a filter cartridge;
the filter manifold comprising:
a valve comprising a fixed portion and a rotary portion;
a manifold feed port and a manifold filtrate port;
a handle operatively connected to the rotary portion, the handle comprising a cartridge lifter having one of a camming ramp or a camming lug lifter engagement feature and having a handle disengagement feature comprising a camming surface positioned opposite the cartridge lifter, the handle being rotatable to a service position and a disengaged position, wherein the manifold feed port is blocked by the valve when the handle is in the disengaged position and the manifold feed is unblocked by the valve when the handle is in the service position;
wherein upon movement to the disengaged position, the handle disengagement feature pushes the filter cartridge in a direction away from the manifold such that the filter cartridge is fully disengaged;
the filter cartridge comprising:
a cartridge feed port, a cartridge filtrate port, and an external cartridge surface having one of a camming lug or a camming ramp for engaging the lifter engagement feature and having a cartridge disengagement feature.

12. The filtration system of claim 11 wherein the lifter engagement feature of the handle comprises the camming ramp that comprises a first ramp portion and a second ramp portion, wherein the filter cartridge comprises the camming lug and the first ramp portion advances the camming lug toward the filter manifold at a greater rate than the second ramp portion.

13. The filtration system of claim 11 wherein the filter manifold further comprises a bracket, wherein the valve is held by the bracket, wherein the fixed portion is attached to the bracket, wherein the bracket comprises a cartridge support shelf disposed on the bracket in a position below the cartridge lifter when the handle is in the service position.

14. The filtration system of claim 11 wherein the filter cartridge comprises a rigid sump having an interior volume and a disposable filter element, at least a portion of the disposable filter element being positionable within the interior volume.

15. The filtration system of claim 14 wherein the external cartridge surface is on the rigid sump.

16. The filtration system of claim 14 wherein the external cartridge surface is on the disposable filter element.

17. The filtration system of claim 11 wherein the valve further comprises a rotation lock connected to the rotary portion and wherein, when the handle is in the disengaged position, rotation is prevented by the rotation lock.

18. The filter manifold of claim 17 wherein the rotation lock comprises a depressible member connected to the rotary portion of the valve and protruding through an aperture in the fixed portion of the valve and depressible from a locking position to an unlocking position.

19. The filter manifold of claim 18 wherein the filter cartridge further comprises a rotation key, wherein the rotation key depresses the depressible member to the unlocking position.

20. A method of assembling a filtration system comprising a filter manifold and a filter cartridge, the filter manifold comprising: a valve comprising a fixed portion and a rotary portion, a manifold feed port and a manifold filtrate port, a handle operatively connected to the rotary portion, the handle comprising a cartridge lifter having one of a camming ramp or a camming lug lifter engagement feature and having a handle disengagement feature comprising a camming surface positioned opposite the cartridge lifter, the handle being rotatable to a service position and a disengaged position, wherein the manifold feed port is blocked by the valve when the handle is in the disengaged position and the manifold feed is unblocked by the valve when the handle is in the service position, and the filter cartridge comprising: a cartridge feed port, a cartridge filtrate port, and an external cartridge surface having one of a camming lug or a camming ramp for engaging the lifter engagement feature and having a cartridge disengagement feature, the method comprising the steps of:
  providing the filter cartridge below the filter manifold while the handle is in the disengaged position;
  rotating the handle into the service position, thereby causing the cartridge lifter to contact the camming ramp with the camming lug, thereby drawing the filter cartridge toward the filter manifold;
  engaging the cartridge feed port to the manifold feed port;
  engaging the cartridge filtrate port to the manifold filtrate port; and
  actuating the valve to unblock the manifold feed port;
  wherein upon movement to the disengaged position, the handle disengagement feature pushes the filter cartridge in a direction away from the manifold such that the filter cartridge is fully disengaged.

\* \* \* \* \*

UNITED STATES PATENT AND TRADEMARK OFFICE
CERTIFICATE OF CORRECTION

Page 1 of 1

PATENT NO. : 9,044,699 B2
APPLICATION NO. : 13/062008
DATED : June 2, 2015
INVENTOR(S) : Brian Gale It is certified that error appears in the above-identified patent and that said Letters Patent is hereby corrected as shown below:

Title Page

On the First Page, in Column 1, under (Inventors)
Line 2, delete "Minnestrista, MN" and insert -- Minnetrista, MN --, therefor.

Specification

Column 2
Line 35, delete "extensions" and insert -- extensions. --, therefor.

Claims

Column 15
Line 31, in Claim 18, delete "filter manifold" and insert -- filtration system --, therefor.

Column 16
Line 1, in Claim 19, delete "filter manifold" and insert -- filtration system --, therefor.

Signed and Sealed this
First Day of March, 2016

Michelle K. Lee
*Director of the United States Patent and Trademark Office*